US010371951B2

(12) United States Patent
Rolland et al.

(10) Patent No.: US 10,371,951 B2
(45) Date of Patent: Aug. 6, 2019

(54) FREEFORM NANOSTRUCTURED SURFACE FOR VIRTUAL AND AUGMENTED REALITY NEAR EYE DISPLAY

(71) Applicant: University of Rochester, Rochester, NY (US)

(72) Inventors: Jannick Rolland, Seneca Falls, NY (US); Nick Vamivakas, Brighton, NY (US); Alexander Kitt, Buffalo, NY (US); Aaron Bauer, Rochester, NY (US)

(73) Assignee: University of Rochester, Rochester, NY (US)

( * ) Notice: Subject to any disclaimer, the term of this patent is extended or adjusted under 35 U.S.C. 154(b) by 0 days.

(21) Appl. No.: 15/562,856

(22) PCT Filed: Mar. 31, 2016

(86) PCT No.: PCT/US2016/025363
§ 371 (c)(1),
(2) Date: Sep. 28, 2017

(87) PCT Pub. No.: WO2016/161175
PCT Pub. Date: Oct. 6, 2016

(65) Prior Publication Data

US 2018/0113310 A1 Apr. 26, 2018

Related U.S. Application Data

(60) Provisional application No. 62/142,327, filed on Apr. 2, 2015.

(51) Int. Cl.
*G02B 27/14* (2006.01)
*G09G 5/00* (2006.01)
(Continued)

(52) U.S. Cl.
CPC ....... *G02B 27/0172* (2013.01); *G02B 6/0016* (2013.01); *G02B 6/0038* (2013.01);
(Continued)

(58) Field of Classification Search
CPC ......................... G02B 27/0172; G02B 6/0016; G02B 6/0038; G02B 27/1066; G02B 5/1809;
(Continued)

(56) References Cited

U.S. PATENT DOCUMENTS

| | | | |
|---|---|---|---|
| 6,185,045 | B1 | 2/2001 | Hanano |
| 2003/0231395 | A1 | 12/2003 | Nakai |
| 2013/0242392 | A1 | 9/2013 | Amirparviz et al. |

FOREIGN PATENT DOCUMENTS

| | | | |
|---|---|---|---|
| EP | 1215522 | A2 | 6/2002 |

OTHER PUBLICATIONS

International Search Report and Written Opinion of the International Searching Authority in corresponding International Application No. PCT/US16/25363, completed Jun. 10, 2016 (10 pages).

(Continued)

*Primary Examiner* — William Choi
(74) *Attorney, Agent, or Firm* — Andrew J. Anderson, Esq.; Harter Secrest & Emery LLP

(57) ABSTRACT

A near eye display includes at least one of a combiner, a secondary mirror, and a waveguide having a freeform nanostructured surface. The freeform nanostructured surface encompasses a freeform surface, a nanostructured surface or a combination of both the freeform surface and the nanostructured surface. The freeform nanostructured surface can be incorporated into a combiner or a secondary mirror in the near eye display in a compact folded geometry, wherein an anamorphic or freeform optic can be optically intermediate an image source and the freeform nanostructured surface. The nanostructured surface can include a meta-grating oper- (Continued)

able across the visible spectrum. The meta-grating includes meta-atoms configured to provide a given efficiency at the desired wavelengths in reflection.

20 Claims, 6 Drawing Sheets

(51) Int. Cl.

| | |
|---|---|
| ***G02B 27/01*** | (2006.01) |
| ***F21V 8/00*** | (2006.01) |
| ***G02B 27/10*** | (2006.01) |
| *G02B 5/18* | (2006.01) |
| *H04N 13/344* | (2018.01) |
| *H04N 9/31* | (2006.01) |

(52) U.S. Cl.
CPC ........ *G02B 27/1066* (2013.01); *G02B 5/1809* (2013.01); *G02B 5/1814* (2013.01); *G02B 5/1876* (2013.01); *G02B 2027/011* (2013.01); *G02B 2027/0125* (2013.01); *G02B 2027/0174* (2013.01); *G02B 2027/0178* (2013.01); *H04N 9/3129* (2013.01); *H04N 13/344* (2018.05)

(58) Field of Classification Search
CPC ................ G02B 5/1814; G02B 5/1876; G02B 2027/011; G02B 2027/0125; G02B 2027/0174; G02B 2027/0178; H04N 13/344; H04N 9/3129
USPC ........................................... 359/630; 345/7–9
See application file for complete search history.

(56) References Cited

OTHER PUBLICATIONS

Yu, Nanfang and Capasso, Federico. "Flat optics with designer metasurfaces". Nature Materials vol. 13, Review Article. pp. 139-150, DOI: 10.1038/NMAT3839. Jan. 23, 2014.

Tamayama et. al. "Electromagnetically induced transparency like transmission in a metamaterial composed of cut-wire pairs with indirect coupling," arXiv:1403.0400v1 [physics.optics], submitted Mar. 3, 2014, pp. 1-7, Apr. 1, 2018.

FIG. 5
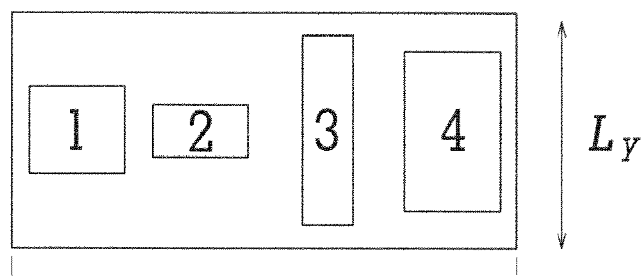
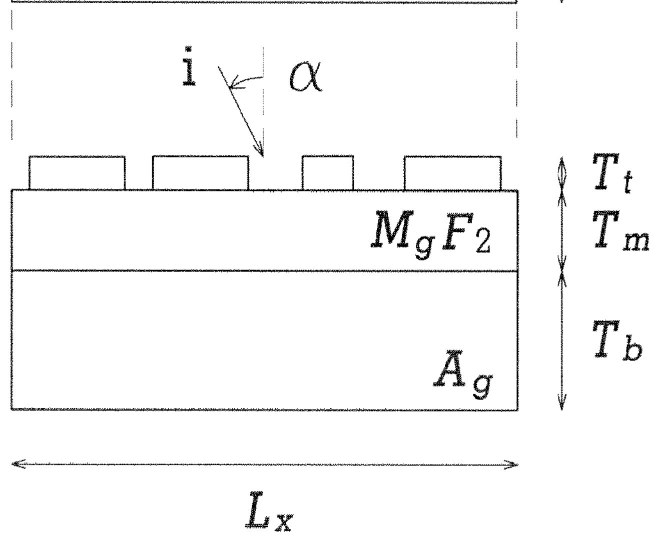
FIG. 6

FREEFORM NANOSTRUCTURED SURFACE FOR VIRTUAL AND AUGMENTED REALITY NEAR EYE DISPLAY

STATEMENT REGARDING FEDERALLY SPONSORED RESEARCH OR DEVELOPMENT

Not applicable.

REFERENCE TO A "SEQUENCE LISTING"

Not applicable.

BACKGROUND

A near-eye display is a wearable device that creates a display in front of a field of vision of a user. The display can be transparent or opaque. For example, a transparent display can overlay information and graphics on top of a view of the real world, while an opaque display presents the viewer with only the information from the near eye display.

SUMMARY

According to aspects illustrated herein, there is provided a near eye display assembly comprising an image source and at least one of a combiner, a secondary mirror, and a waveguide optically coupled to the image source, wherein the at least one of a combiner, a secondary mirror and a waveguide includes a freeform nanostructured surface having a meta-grating at least partially defined by a unit cell having a plurality of meta-atoms.

According to further aspects illustrated herein, there is provided a near eye display having at least one of a combiner and a secondary mirror operably connected to an image source; wherein at least one of the combiner and the secondary mirror includes a freeform nanostructured surface, further wherein the freeform nanostructured surface encompasses a freeform surface, a nanostructured surface or a combination of both the freeform surface and the nanostructured surface.

According to further aspects illustrated herein, there is provided a near eye display having a combiner and a secondary mirror operably connected to the combiner; wherein at least one of the combiner and the secondary mirror includes a meta-grating at least partially defined by a unit cell having a plurality of meta-atoms.

According to another aspect, there is provided a near eye display assembly having a frame releasably engaging a head of a wearer; a combiner operably connected to the frame and a secondary mirror operably connected to one of the combiner and the frame, wherein at least one of the combiner and the secondary mirror includes a freeform nanostructure surface having a meta-grating at least partially defined by a unit cell having a plurality of meta-atoms, the meta-atoms within the unit cell having different length to width ratios and sized and spaced to provide an efficiency of at least 50% over a majority of the visible light spectrum.

In another aspect, there is provided a near eye display assembly having an image source and a waveguide optically coupled to the image source; wherein the waveguide includes a freeform nanostructured surface having a meta-grating at least partially defined by a unit cell having a plurality of meta-atoms.

According to further aspects, there is provided a near eye display assembly having a frame; a combiner operably connected to the frame as a first reflective surface and a secondary mirror operably connected to the frame as a second reflective surface, each of the combiner and the secondary mirror including a freeform nanostructured surface, wherein the underlying surface shape may be freeform or the nanostructure overlaid on the surface itself can create a freeform surface, or combination thereof, and wherein the freeform property is configured to correct optical aberrations induced by a tilting and decentering of the first reflective surface and the second reflective surface.

BRIEF DESCRIPTION OF THE DRAWINGS

FIG. 5 is a top plane view of unit cell of the meta-grating.

FIG. 6 is a side cross-section view of the unit cell of FIG. 5.

DETAILED DESCRIPTION

Figure 1A:
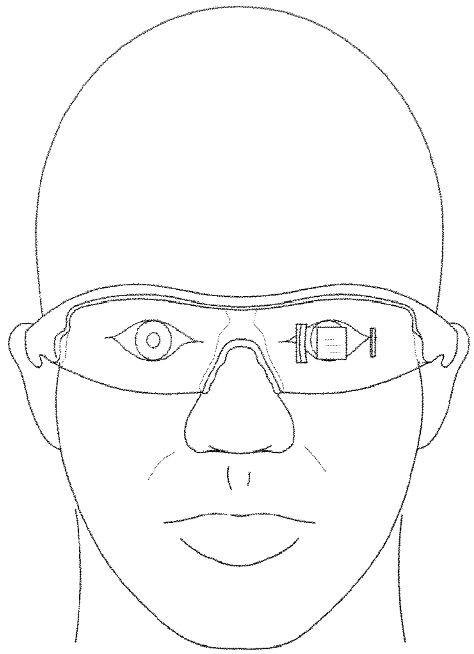
FIGS. 1*a* and 1*b* schematically illustrate a first aspect of a near eye display incorporating a meta-grating.

A near-eye display presents image information to a viewer within viewing pupils (also referred to as "eyeboxes"), which when aligned with the pupils of the eyes of the viewer, produce virtual images within the field of view of the viewer. Combiners, or waveguides, of near-eye displays convey image information toward the eyes of the viewers from positions outside the field of view of the viewer. The image information conveyed by the combiner, or waveguides, can have an angularly encoded form for projecting virtual images into the eyes of the viewer.

The combiner is an optical apparatus that combines two images together, from either the same side of the combiner (reflective/reflective, or transmissive/transmissive) or from the two different sides of the combiner (reflective/transmissive). Combiners can be used in heads up displays ("HUDs"), sometimes referred to as head mounted displays ("HMDs") or near-to-eye displays, which allow a user to view a computer generated image ("CGI") superimposed over an external view. The HUD enables the user to view the CGI without having to look away from his usual viewpoint.

Generally, there are two versions of combiners. The first version combines two fields without adding any lensing to either field (such as a tilted dichroic plate). The second version includes a lensing functionality, in addition to the combining functionality, which can be an all-spherical, off-axis conic, aspheric, or freeform lensing for the field coming from the display. The lensing functionality is used to displace the virtual image originating from the display into the far field or at a specific distance from the combiner and to give the image a certain field of view to enable the user to bring the virtual image into focus at the target size. The lensing functionality is configured to provide adequate correction of the optical aberrations throughout the field of view being displayed. The lensing functionality may also be configured to provide ophthalmic correction for individual users.

The waveguides, sometimes called light guides, include but are not limited to diffractive, holographic, polarized or reflective waveguides. Aspects of the nanostructured surface can be used to couple light into and/or out of the waveguide.

The image information originates outside the field of view of the viewer, such as along the temples of eyeglass frames. Electronic video display data is converted into the image information by an image source or generator, such as an optical pattern generator, including but not limited to spatial light modulators, combined with focusing optics that angularly transform the spatial patterns or by scanning optics that directly generate angular transforms of spatial patterns. The image source encompasses any device for creating or transmitting a light pattern to the combiner. The image source includes image generators such as, but not limited to laser scanning source generators based on Light Emitting Diodes (LEDs) and Vertical Cavity Surface-Emitting Lasers (VCSELs), microdisplays, including but not limited to liquid crystal displays, either reflective or transmissive displays, and Organic Light-Emitting Diode (OLEDs), which may also be combined with an anamorphic or freeform optical element or lens within the scanning optical path or located close or against the microdisplay to control optical aberrations. A nonsymmetric surface with bi-axial symmetry is referred as an anamorphic surface. A nonsymmetric surface whose asymmetry goes beyond bi-axial symmetry or toroidal shape is a freeform surface. Thus, the image source can include an emissive microdisplay, such as an OLED display, and/or a reflective microdisplay, such as an LCoS (Liquid Crystal on Silicon) display or DLP (Digital Light Processing) device. In certain aspects, a separate microdisplay may be utilized for each color of light displayed, while in other aspects a single microdisplay may be utilized (e.g. by displaying a color field sequential image). Likewise, in some aspects, separate image sources may be utilized for the left and right eye of a viewer. This may facilitate the display of stereoscopic images. In such aspects, separate combiners may be used to produce separate left-eye and right-eye images.

The combiner, or waveguide, can be operably connected to eyeglasses that can be worn on the head of a viewer. The eyeglasses include a frame having left and right temples that rest over the ears and a nose piece that rests over the nose. The frame is shaped and sized to position each optical combiner, or waveguide, in front of a corresponding eye of the viewer. It is understood, other frames having other shapes may be used (e.g., a visor with ear arms and a nose bridge support, a single contiguous headset member, a headband, goggle type eyewear, etc.). The term eyeglass includes corrective lenses, sunglasses, protective lenses, frames with or without lenses or with or without corrective lenses, as well as any other head mount for operably locating and maintaining the near eye display within the field of view of the viewer. Thus, the eyeglasses can locate the secondary mirror proximal to the combiner or spaced apart from the combiner.

The combiner, or waveguide, can be operably connected to the frames in place of or in addition to eyeglass lenses, and convey the image information from outside the field of view of the viewer into the field of view of the viewer in a form that minimizes the thicknesses of the near-eye displays in front of the eyes of the viewer. The combiner occupies a limited volume of space corresponding to the space within which eyeglass lenses are normally held within the eyeglass frames. That is, the combiner may be a surface off which light bounces that can be limited in thickness (i.e., depth) to more closely resemble the dimensions of conventional eyewear. The waveguide may be flat or curved, with freeform nanostructured surfaces coupling light into the waveguide.

Figure 1B:
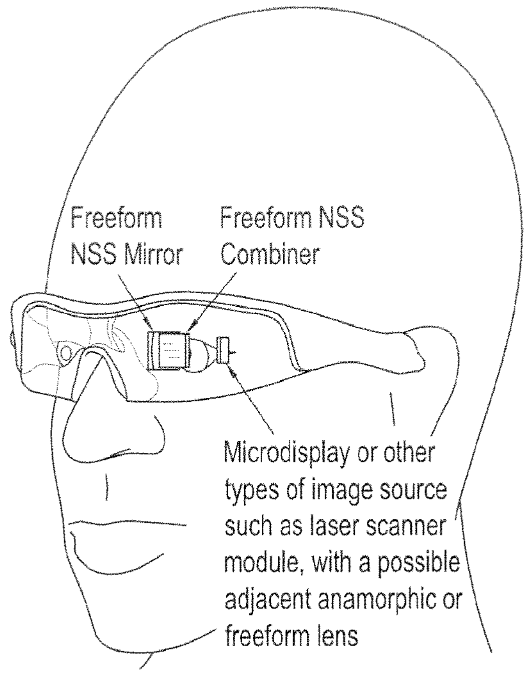
Figure 2A:
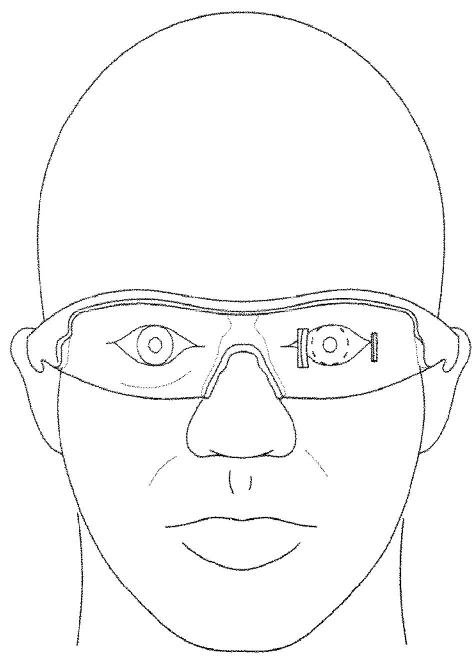
FIGS. 2*a* and 2*b* schematically illustrate a second aspect of a near eye display incorporating a meta-grating.
Figure 2B:
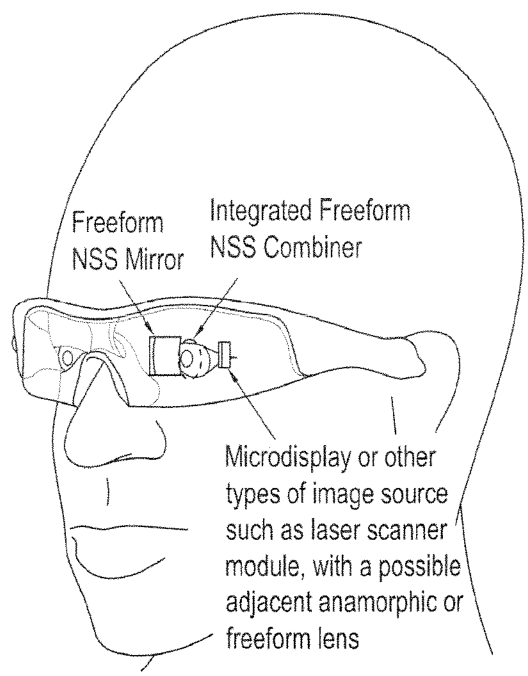
Figure 3A:
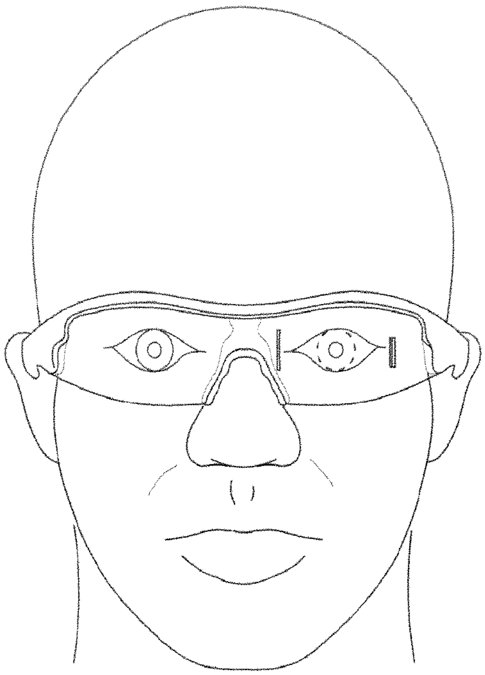
FIGS. 3*a* and 3*b* schematically illustrate a third aspect of a near eye display incorporating a meta-grating.
Figure 3B:
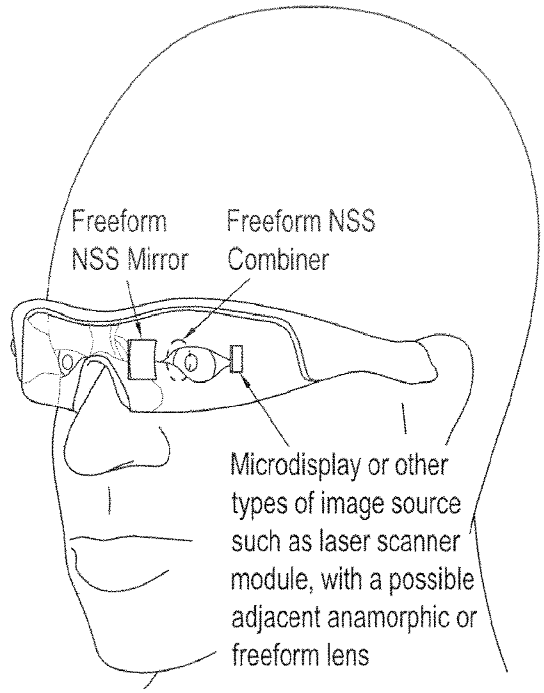
Figure 4A:
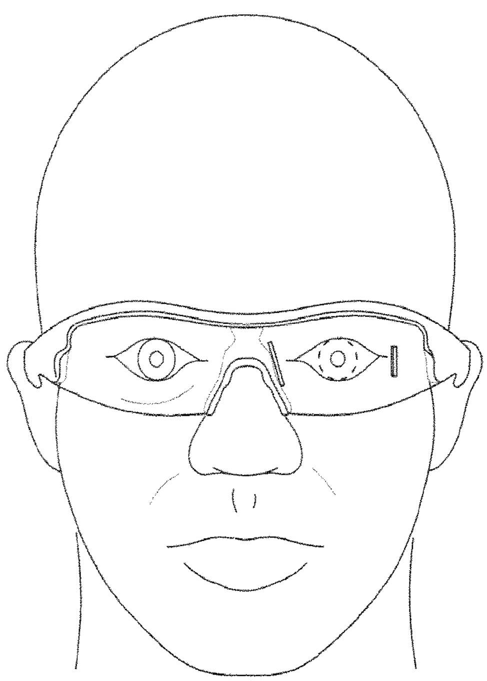
FIGS. 4*a* and 4*b* schematically illustrate a fourth aspect of a near eye display incorporating a meta-grating.
Figure 4B:
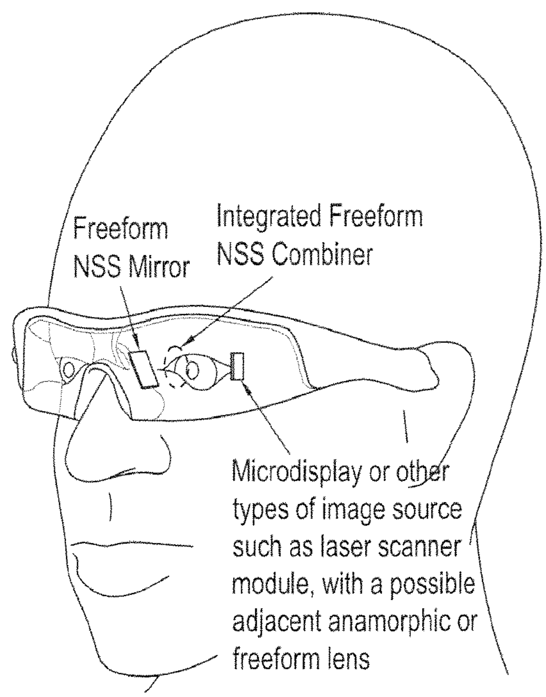

A near eye display assembly incorporating a combiner together with a secondary freeform mirror, including nanostructured surfaces, and an image source is illustrated in FIGS. 1-4. FIGS. 1-4 illustrate a variety of geometries of the near eye display including a base geometry of FIGS. 1*a* and 1*b*; a base geometry with a combiner in FIGS. 2*a* and 2*b*; a geometry, wherein a freeform mirror is located proximal to the nose in FIGS. 3*a* and 3*b* and a geometry of the near eye display, wherein a freeform mirror is conformal in FIGS. 4*a* and 4*b*. In FIG. 1, the image source is optically coupled to the combiner and the secondary mirror. In one aspect, the combiner, the secondary mirror and the image source define a folded geometry of a connecting optical path. In a further aspect, an optical element such as, but not limited to spherical, aspheric, anamorphic, anamorphic aspheric, or freeform optics or lens can be optically intermediate to the image source and the freeform nanostructured mirror, the waveguide or the combiner.

The near eye display can include two reflective surfaces, the combiner and the secondary mirror wherein the combiner and the secondary mirror are in an off axis folded geometry. In one aspect, each of the combiner and the secondary mirror include a freeform nanostructured surface. In another aspect, both the combiner and the secondary mirror can include a freeform surface, a nanostructured surface or a combination of both the freeform surface and the nanostructured surface.

It is understood the near eye display can include additional optics, such as but not limited to a lens in the optical path of the source generator. The lens or additional optics may be all-spherical, aspheric, anamorphic, anamorphic aspheric, or freeform, or combination of all-spherical, aspheric, anamorphic, anamorphic aspheric or freeform.

While aspects of the near eye display assembly are set forth for purposes of description in terms of particular aspects of the freeform nanostructured surface as combinations of the freeform surface, the nanostructured surface or the combination of both the freeform surface and the nanostructured surface, it is understood, the combiner and the secondary mirror can be independently configured to have a freeform nanostructured surface as the freeform surface, the nanostructured surface or the combination of both the freeform surface and the nanostructured surface.

Generally, the freeform surface is used to correct optical aberrations induced by tilting and decentering of the reflective surfaces in a folded geometry. As used herein, a freeform optical surface is any rotationally nonsymmetric surface whose asymmetry goes beyond bi-axial symmetry or toroidal shape. A freeform surface may be parameterized by normalized basis functions such as the phi-polynomials (e.g. Zernike sets, Q-polynomials, other sets of orthogonal polynomials, XY polynomials, Radial Basis Functions, Splines, or Non-Uniform Rational Basis Spline (NURBS). As used herein, a surface with bi-axial symmetry is referred to as an anamorphic surface.

The nanostructured surface provides for wavefront control. A nanostructured surface is a surface or substrate in which the typical features have dimensions in the range about 1-200 nm.

At least one and in selected aspects both the combiner and the secondary mirror include a meta-grating as the nanostructured surface. In a further aspect, the meta-grating controls the wavefront across the visible spectrum. The engineered structure of the unit cells and the substructures within each unit cell can create a type of freeform surface as well. That is, the freeform surface can be the meta-grating surface itself or in combination with the freeform substrate.

The meta-grating is formed of a plurality of unit cells, wherein each unit cell includes a plurality of meta-atoms. The sizing and spacing of the meta-atoms at least partially determines the operating characteristics of the meta-grating. In one aspect, the meta-grating is configured as an 1800 lines/mm visible spectrum meta-grating.

Referring to FIGS. 5 and 6, a unit cell of an 1800 lines/mm visible spectrum meta-grating is shown. As shown in FIGS. 5 and 6, the unit cell can include four meta-atoms. In FIG. 5, the meta-atoms are number 1-4, in order of decreasing phase.

In one aspect, the unit cell includes three layers—a base layer, a dielectric layer and a meta-atom layer. The dielectric layer is supported by the base layer and the meta-atom layer is supported by the dielectric layer.

The base layer is a metal layer, such as silver. The dielectric layer is formed of magnesium fluoride. As set forth in the table below, the base layer has a thickness of approximately 130 nm and the dielectric layer has a thickness of approximately 75 nm. To ensure both reflectivity and transmissivity, the meta-grating device is perforated with an aperture pattern and sizing that allows the transmission of light through the meta-grating. The perforations are sufficient to render the device substantially transparent to the viewer.

The dimensions of the meta-atoms in the unit cell of an 1800 lines/mm visible spectrum meta-grating having four meta-atoms are set forth in the table below and as labelled in FIGS. 5 and 6.

| | |
|---|---|
| $L_x$ | 555.5 nm |
| $L_y$ | 221 nm |
| $T_b$ | 130 nm |
| $T_m$ | 75 nm |
| $T_t$ | 30 nm |
| $l_1$ | 84.6 nm |
| $w_1$ | 105 nm |
| $l_2$ | 47.7 nm |
| $w_2$ | 105 nm |
| $l_3$ | 177 nm |
| $w_3$ | 50 nm |
| $l_4$ | 150 nm |
| $w_4$ | 105 nm |

In one aspect, manufacturing considerations are eased by the configuration of the unit cell having each dimension of each meta-atom and the spacing between adjacent meta-atoms be greater than approximately 10 nm and less than approximately 80 nm. In some aspects, the minimum manufacturing dimension of a meta-atom dimension or spacing between adjacent meta-atoms is greater than approximately 25 nm and less than approximately 60 nm. However, it is understood manufacturing processes may enable the configuration of the unit cell to include dimensions of approximately 1 nm.

It is contemplated in the off-axis folded geometry of a near eye display, that either one or both the combiner and the secondary mirror include a freeform nanostructured surface having a freeform surface as well as a nanostructured surface, such as the meta-grating.

Figure 7:
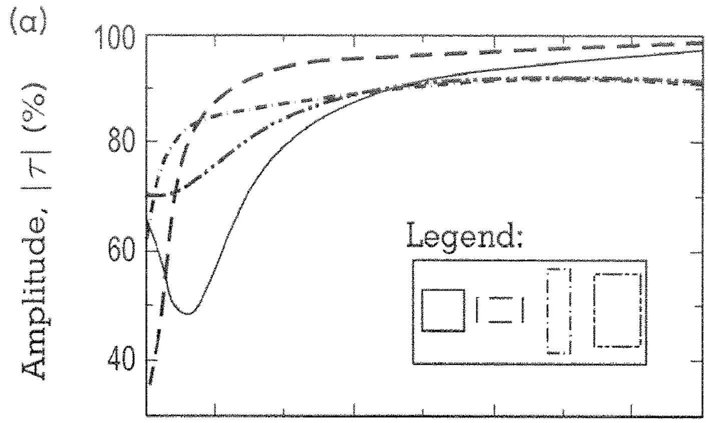
FIG. 7 is a plot of the individual responses of the four meta-atoms of the unit cell of FIG. 5 showing the amplitude for a normally incident plane wave on a uniform periodic array of four meta-atoms versus wavelength.

As seen in FIG. 7, all four meta-atoms exhibit amplitudes greater than 80% for wavelengths longer than 575 nm. Across most of the spectral range, the phase difference between the second, third and fourth meta-atom is consistent.

Figure 8:
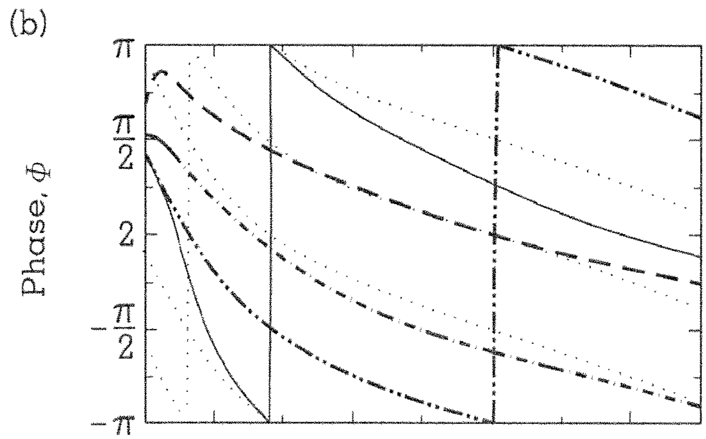
FIG. 8 is a plot of the individual responses of the four meta-atoms of the unit cell of FIG. 5 showing the phase of the complex reflection coefficient, $r=|r|e^{i\varnothing}$, for a normally incident plane wave on a uniform periodic array of four meta-atoms versus wavelength.

In FIG. 8, the most solid line represents the ideal $2\pi/4$, phase difference between adjacent meta-atoms using the fourth meta-atom as a baseline.

Figure 9:
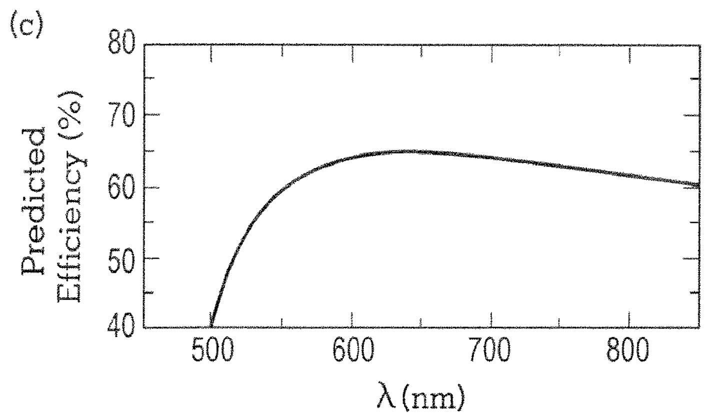
FIG. 9 is a plot of the absolute efficiencies predicted based on the reflectivities versus wavelength.

The wavelength dependent efficiency of the meta-grating generally qualitatively agrees with the predicted efficiencies of FIG. 9. The efficiency increases toward the red as the individual meta-atom efficiency increases then decreases for the longer wavelengths where the phase spacing between the meta-atoms degrades. The angle dependencies are similar in shape to the TE-polarized ruled-grating efficiencies and the maximum follows for the condition $\alpha=\beta$. This suggests that the origin is the variation in accrued propagation phase.

Figure 10:
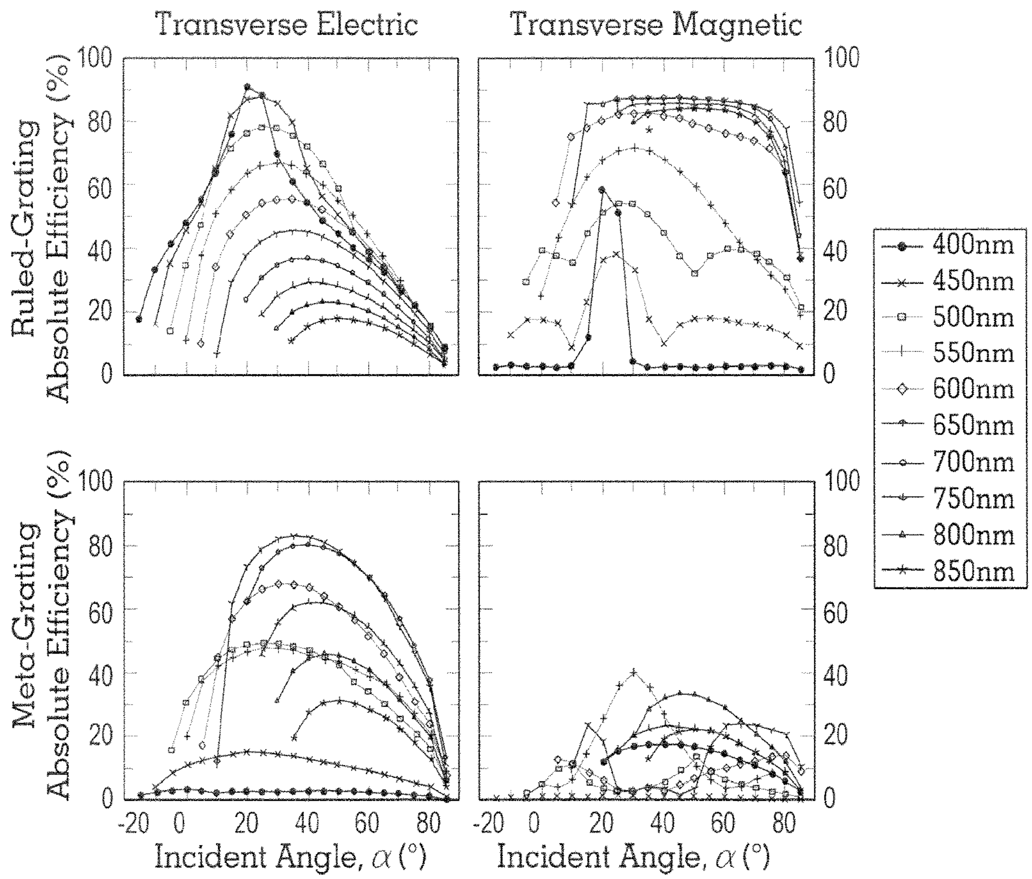
FIG. 10 is a comparison of m=+1 simulated absolute grating efficiencies for a ruled-grating and the meta-grating as a function of polarization, incident angle and wavelength.

FIG. 10 is a plot of the simulated $m=+1$ absolute grating efficiencies of the meta-grating and a ruled-grating versus incident angle for Transverse Electric (TE) and Transverse Magnetic (TM). Each curve illustrated in the plot represents an incident angle dependent response for a single wavelength and spans only those incident angles that result in diffraction angles less than 90°. The simulations were performed by illuminating the periodic surface with a plane wave with incident angle $\alpha$ and then projecting the reflected fields into the far field to determine grating efficiencies.

Overall, meta-grating TE-polarized efficiencies are higher than the ruled-grating TE polarized efficiencies for wavelengths longer than 600 nm and is competitive with the TM polarized efficiencies for wavelengths between 500 nm and 650 nm.

The meta-grating exhibits sensitivity in polarization response, as compared to a ruled grating of 1800 lines/mm. The electric field of the transverse magnetic polarization is not aligned with the meta-atoms and thus does not excite the resonances that create wavefront modulation.

Figure 11:
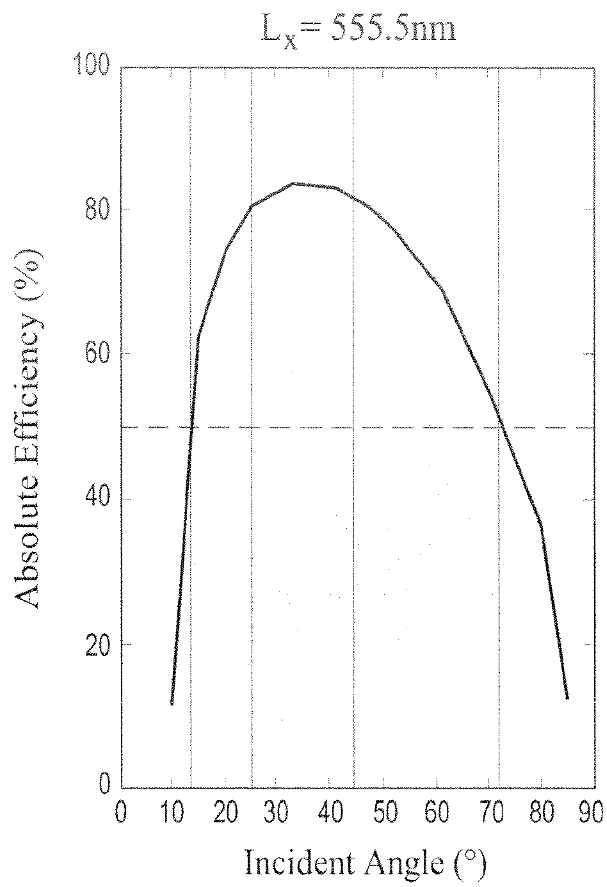
FIG. 11 is the efficiency of the meta-grating as a function of incidence angle detailing wide field of view.

Referring to FIG. 11, the diffraction efficiency as a function of incidence angle with a unit cell having a length of about 555.5 nm and the meta-atoms set forth in the above table at an illumination wavelength of 650 nm. As seen in FIG. 11, the dotted horizontal line represents an approximately 50% efficiency, wherein the inner shaded region corresponds to a 20° field of view and the outer shaded region corresponds to a 60° field of view. Thus, the meta-grating provides an efficiency of at least approximately 50% over a majority of the visible light spectrum. It is understood the meta-grating can be configured to provide a given predetermined efficiency, such as for example less than 50%. In this way, the meta-grating can provide an efficiency of at least approximately 20%, or 30%, or 40% or 50% over a majority of the visible light spectrum.

In one aspect, the meta-grating is configured to provide at least approximately 50% efficiency at the desired wavelengths in reflection, and as a function of the angle of incident light on the meta-grating, within a range of operation that spans about 20° and up to 80° in alternative geometries. It is understood the mean angle of incidence varies for different geometries of the unit cell.

The freeform component is selected to correct optical aberrations induced by tilting and decentering reflective surfaces, as off-axis in a folded compact geometry. A freeform surface may be parameterized by normalized basis functions such as the phi-polynomials (e.g. Zernike sets, Q-polynomials, other sets of orthogonal polynomials, XY polynomials, Radial Basis Functions, Splines, or NURBS).

Figure 12:
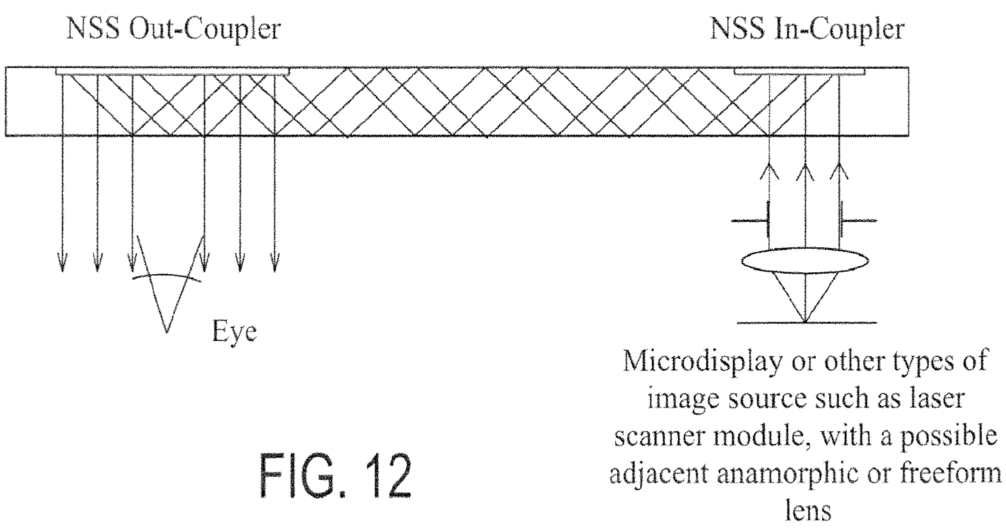
FIG. 12 is a schematic representation of an aspect of the near eye display employing a waveguide.

Referring to FIG. 12, the waveguide is shown with a nanostructured surface in an in-coupler to the waveguide and in an out-coupler to the waveguide.

In manufacture, it is anticipated the meta-gratings of the nanostructured surface replace the required height profile control and period control that can create problems in ruled-gratings with the two dimensional binary surface control used in producing meta-gratings. As set forth above, the dimensions necessary for a meta-grating configured as an 1800 lines/mm visible surface can be greater than approximately 10 nm. While necessary dimensions greater than approximately 10 nm can assist in manufacturing, if manufacturing processes can provide for manufacture of the dimensions on the order of 1 nm, then the nanostructured surface can employ dimensions of at least approximately 1 nm.

The freeform optical surfaces can be designed with commercially available software, such as CODE V optical design software from Synopsys, Inc. of California and fabricated with commercially available equipment such as, but not limited to, a slow or fast tool servo on a Diamond Turning or Milling Machine. Freeform surfaces may also be molded out of a fabricated master.

Thus, a virtual or augmented reality head mounted display is provided, wherein at least one reflective surface is freeform, nanostructured surfaces such as the described meta-grating or a combination of a freeform surface and a nanostructured surface such as the meta-grating. Thus, in an aspect wherein the freeform nanostructured surface encompasses the freeform surface, the nanostructured surface or the combination of both the freeform surface and the nanostructured surface, the near eye display assembly includes a combiner or a combiner and a secondary mirror operably connected to the combiner, wherein at least one of the combiner and the secondary mirror include a freeform nanostructured surface. In one aspect, both the combiner and the secondary mirror include a freeform nanostructured surface.

In a further aspect, a virtual or augmented reality near eye display is provided with a waveguide, wherein at least one optical surface in the waveguide is a nanostructured surface, such as the meta-grating.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A near eye display assembly comprising:

(a) an image source; and (b) at least one of a combiner, a mirror, and a waveguide optically coupled to the image source;

wherein the at least one of a combiner, a mirror, and a waveguide includes a nanostructured surface having a meta-grating at least partially defined by a unit cell having a plurality of meta-atoms.

2. The near eye display assembly of claim 1, wherein the unit cell includes at least four meta-atoms.

3. The near eye display assembly of claim 1, wherein each of the meta-atoms in the unit cell has a different length to width ratio.

4. The near eye display assembly of claim 1, wherein the meta-grating is selected to have at least 20%+1 diffraction order absolute grating efficiency across the visible spectrum.

5. The near eye display assembly of claim 1, comprising a combiner having a first reflective surface and a mirror having a second reflective surface optically coupled to the combiner, wherein the combiner and the secondary mirror are in an off-axis folded geometry and wherein at least one of the combiner and the mirror includes a nanostructured surface having a meta-grating at least partially defined by a unit cell having a plurality of meta-atoms.

6. The near eye display assembly of claim 1, wherein each of the meta-atoms has a dimension greater than 1 nm.

7. The near eye display assembly of claim 6, wherein each of the meta-atoms has a dimension greater than 10 nm.

8. The near eye display assembly of claim 1, comprising a combiner and wherein the combiner includes a multitude of apertures sized and spaced to render the combiner substantially transparent to a viewer.

9. The near eye display assembly of claim 1, wherein the meta-grating is selected to have at least 20%+1 diffraction order absolute grating efficiency across at least a 60° incident angle.

10. The near eye display assembly of claim 1, comprising a combiner having a first reflective surface and a mirror having a second reflective surface, wherein both the combiner and the mirror include a freeform surface.

11. The near eye display assembly of claim 1, wherein the unit cell has a length of approximately 555.5 nm and a width of approximately 221 nm and a first meta-atom has a length of approximately 105 nm and a width of approximately 84.6 nm, a second meta-atom has a length of approximately 105 nm and a width of approximately 47.7 nm, a third meta-atom has a length of approximately 50 nm and a width of approximately 177 nm and a fourth meta-atom has a length of approximately 105 nm and a width of approximately 150 nm.

12. The near eye display assembly of claim 1, wherein the nanostructured surface includes a freeform surface.

13. The near eye display assembly of claim 1, comprising a frame releasably engaging a head of a wearer, and a combiner having a first reflective surface and a mirror having a second reflective surface operably connected to the frame;

wherein at least one of the combiner and the secondary mirror includes a nanostructured surface having a meta-grating at least partially defined by a unit cell having a plurality of meta-atoms, the meta-atoms within the unit cell having different length to width ratios and sized and spaced to provide a given predetermined +1 diffraction order absolute grating efficiency over a majority of the visible light spectrum.

14. The near eye display assembly of claim 13, wherein the image source is optically coupled to the mirror along an optical path and further comprising an optical element in the optical path, wherein the optical element is one of a spherical, aspheric, anamorphic, anamorphic aspheric, or freeform optic or lens.

15. The near eye display assembly of claim 13, wherein the unit cell has four meta-atoms, each having a different length to width ratio.

16. The near eye display assembly of claim 13, wherein each of the combiner and the mirror includes a nanostructured surface having a meta-grating at least partially defined by a unit cell having a plurality of meta-atoms, the meta-atoms within the unit cell having different length to width ratios and sized and spaced to provide an +1 diffraction order absolute grating efficiency of at least 20% over a majority of the visible light spectrum.

17. The near eye display assembly of claim 13, wherein the nanostructured surface comprises a combination of both a freeform surface and a nanostructured surface.

18. The near eye display assembly of claim 1, comprising: a frame; a combiner operably connected to the frame as a first reflective surface; and a mirror operably connected to the frame as a second reflective surface;

at least one of the combiner and the mirror including a nanostructured surface, and at least the other of the combiner and the mirror including a freeform surface, wherein the freeform component corrects optical aberrations induced by a tilting and decentering of the first reflective surface and the second reflective surface.

19. The near eye display assembly of claim 18, wherein the nanostructured surface comprises a combination of both a freeform surface and a nanostructured surface.

20. The near eye display assembly of claim 1, comprising a waveguide optically coupled to the image source;

wherein the waveguide includes a nanostructured surface having a meta-grating at least partially defined by a unit cell having a plurality of meta-atoms.

* * * * *